United States Patent Office 2,705,720
Patented Apr. 5, 1955

2,705,720

PROCESS FOR THE PRODUCTION OF 4,16-PREGNADIENE-3,11,20-TRIONE

Douglas A. Lyttle and Robert H. Levin, Kalamazoo Township, Kalamazoo County, Mich., assignors to The Upjohn Company, Kalamazoo, Mich., a corporation of Michigan No Drawing. Application December 21, 1953,
Serial No. 399,591

15 Claims. (Cl. 260—397.3)

The present invention relates to a novel chemical process for the production of 4,16-pregnadiene-3,11,20-trione, which may be illustrated by the following equation wherein X is halogen:

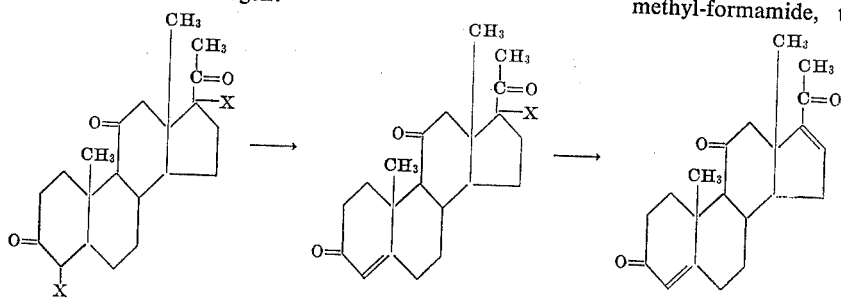

The process involves forming a 3-hydrazone of 17-halo-4-pregnene-3,11,20-trione by treating 4,17-dihalopregnane-3,11,20-trione, in the presence of an acid, with an organic hydrazine capable of forming a hydrazone; hydrolyzing the 3-hydrazone; and dehydrohalogenating the resulting 17-halo-4-pregnene-3,11,20-trione to form the desired 4,16-pregnadiene-3,11,20-trione. In this process any organic hydrazine containing two hydrogen atoms on one of the hydrazino nitrogen atoms can be used. The hydrolysis of the 3-hydrazone group is advantageously effected by an exchange reaction with a ketaldone. The word "ketaldone" refers generically to aldehydes and ketones. For this purpose a ketaldone in which the oxo group is attached to an electrophilic group, as in pyruvic acid, pyruvic aldehyde, and benzaldehydes, such as meta-, para-, and ortho-hydroxybenzaldehydes, and meta-, para-, and ortho-carboxybenzaldehydes, is advantageous. The dehydrohalogenation advantageously is effected with an amine such as pyridine. The 17-halo-4-pregnene-3,11,20-triones, and processes for their production, were originally claimed in our copending application, Serial Number 399,592, filed December 21, 1953, now abandoned. The 4,17-dihalopregnane-3,11,20-triones, and processes for their production, were originally claimed in our copending application, Serial Number 399,593, filed December 21, 1953, now abandoned.

It is an object of the present invention to provide a process for the production of 4,16-pregnadiene-3,11,20-trione. Other objects will be apparent to one skilled in the art to which this invention pertains.

The 4,16-pregnadiene-3,11,20-trione produced by the process of this invention is a stable, easily crystallizable solid which has valuable pharmacological and physiological activity, and is also an important intermediate in the production of other physiologically active 11-oxygenated-ketosteroids. For example, epoxidation of 4,16-pregnadiene-3,11,20-trione yields 11-keto-16,17-oxidoprogesterone. The epoxide is then opened with hydrogen bromide and the resulting 16-bromo-17α-hydroxy derivative is treated with zinc dust to remove the bromine and yield the known 17α-hydroxy-11-ketoprogesterone (21-desoxy "E"), which on treatment with lead tetraacetate, followed by saponification gives cortisone (17α,21-dihydroxy-4-pregnene-3,11,20-trione), or on treatment with lithium aluminum hydride, with protection of the 3- and 20-keto groups, gives 11β,17α-dihydroxy-4-pregnene-3,20-dione (21-desoxy "F"), a new compound possessing pronounced inhibiting effect on the secretion of the adrenocorticotropic hormone (ACTH) and having value, therefore, in the treatment of diseases where oversecretion of ACTH and adrenal hormones occurs, for example, in adrenal hyperplasia and pituitary basophilism (Cushing's disease).

The dihalogen compounds of the present invention are 4,17-dihalopregnane-3,11,20-triones. The halo group advantageously is bromine or chlorine. The dihalogen compounds can be prepared by treatment of pregnane-3,11,20-trione with an acid anhydride to form the corresponding enol ester, a 3,11,20-triacyloxy-3,9,17(20)-pregnatriene, which by treatment with a hypohalous acid furnishes the 4,17-dihalopregnane-3,11,20-triones.

In carrying out the process of the present invention, a 4,17-dihalopregnane-3,11,20-trione is dissolved in an organic solvent, such as dioxane, acetic acid, acetone, dimethyl-formamide, tertiary-butyl alcohol, ethanol, or mixtures of these solvents, with dioxane and acetic acid preferred, containing from five to 25 percent water, and to this solution is added, usually with continuous stirring, a solution of organic hydrazine, such as semicarbazide, phenylhydrazine, 2,4 - dinitrophenylhydrazine, para-nitrophenylhydrazine, α- or β-naphthylsemicarbazine, 2,4- and 3,5-dinitrophenylsemicarbazide, and other substituted hydrazines, with semicarbazide preferred. Usually the reaction is conducted at room temperature, e. g., between about twenty and about thirty degrees centigrade, by agitating for several hours. However higher or lower temperatures, and somewhat shorter, or longer, periods of agitation or stirring, can be used.

The 17-halo-4-pregnene-3,11,20-trione 3-substituted hydrazone thus-obtained can be isolated from the reaction mixture by adding more water and filtering the precipitated compound, or, in the preferred embodiment of the invention, can be immediately reacted with a suitable aldehyde or ketone without isolation. The aldehydes or ketones used are usually pyruvic acid, pyruvic aldehyde, and benzaldehydes such as, hydroxy- and carboxybenzaldehydes, and the like. Pyruvic acid is preferred since it is water soluble and can be used in aqueous organic solvents such as dioxane-water solution. The benzaldehydes are usually used in acetic acid solutions. The temperature of reaction can vary between about zero and about 100 degrees centigrade but advantageously is kept between about 25 and about seventy degrees. The reaction time depends in part on the temperature and varies at room temperature, i. e., from about twenty to about thirty degrees centigrade, from about eight to about 36 hours, and, at temperatures between fifty and seventy degrees centigrade, from about one to about four hours. The product, 17-halo-4-pregnene-3,11,20-trione, can be isolated from the solution by pouring the cooled solution into water and extracting with a suitable solvent, such as dichloromethane, chloroform, ether or benzene, and evaporating the solvent from the resulting extract.

The 17-halo-4-pregnene-3,11,20-trione is then admixed with a large excess of an amine which acts both as a reactant and as a solvent, and the resulting solution is heated for a suitable length of time. Any suitable amine, such as, for example, pyridine, quinoline, picoline, lutidine, collidine, methylbenzylamine, aniline and the like can be used. Pyridine is the preferred amine. The reaction is generally conducted at the boiling point of the solution, but any temperature of about eighty to about 180 degrees centigrade is operative. The period of heating is usually dependent on the amine used, with the higher-boiling amines requiring a shorter period of heating than the lower-boiling amines. A period from about four to about 24 hours is suitable with about eight hours being preferred. If the amine used has a very high boiling point, a solvent such as benzene, toluene, xylene, or the like, can be advantageously employed for temperature control. The thus-produced 4,16-pregnadiene-3,11,20-trione can be recovered from the reaction mixture by conventional means, such as extraction and recrystallization.

The following examples illustrate the process and product of the present invention but are not to be construed as limiting.

PREPARATION 1.—3,11,20-TRIACETOXY-3,9,17(20)-PREGNATRIENE

A solution of ten grams of pregnane-3,11,20-trione, 350 milliliters of acetic anhydride and three grams of para-toluene sulfonic acid monohydrate is heated to boiling and allowed to distil slowly so that 200 milliliters of distillate is collected in four hours. Most of the remaining acetic anhydride then is removed by distillation under reduced pressure. The last traces of acetic anhydride are removed by azeotropic distillation with 250 milliliters of methylcyclohexane. Benzene, 250 milliliters, is added to the residue, and the resulting solution is washed with cold aqueous sodium bicarbonate solution until the wash is alkaline. The solution is then washed with water and dried over anhydrous magnesium sulfate. The drying agent is removed by filtration, and five grams of magnesium silicate (Westvaco Magnesol) is added to decolorize the solution. Filtration gives a light yellow solution, which on solvent distillation providese 3,11,20-triacetoxy-3,9,17(20)-pregnatriene.

In the same manner other 3,11,20-triacyloxy-3,9,17-(20)-pregnatrienes are prepared by heating pregnane-3,-11,20-trione with a selected acid anhydride, including 3,11,20-tripropionoxy-, 3,11,20-tributyroxy-, 3,11,20-trivaleroxy-, 3,11,20-triisovaleroxy-, 3,11,20-trihexanoyloxy-, 3,11,20-trioctanoyloxy-, 3,11,20-tribenzoyloxy-3,-9,17(20)-pregnatriene, and the like.

Example 1.—4,17-dibromopregnane-3,11,20-trione

The 3,11,20-triacetoxy-3,9,17(20)-pregnatriene from Preparation 1 is dissolved in 300 milliliters of tertiary-butyl alcohol and treated with a solution of 10.68 grams of N-bromosuccinimide in 900 milliliters of tertiary-butyl alcohol followed by 362 milliliters of 0.8 Normal sulfuric acid. After two hours of standing in the dark the solution is concentrated to dryness, and the resulting crystalline residue is slurried with 250 milliliters of water. The product is collected on a filter, washed with water, and dried under vacuum. Recrystallization from methylene chloride-ethanol solvent gives six grams of 4,17-dibromopregnane-3,11,20-trione; melting point 196 to 197 degrees centigrade (with decomposition); $[\alpha]_D^{23}$ 27 degrees (chloroform).

Anal.—Calc. for $C_{21}H_{28}O_3Br_2$: C, 51.65; H, 5.78; Br, 32.74. Found: C, 51.86; H, 5.83; Br. 32.87.

In the same manner, using other 3,11,20-tri-enol acylates of pregnane-3,11,20-trione and N-bromosuccinimide, 4,17-dibromopregnane-3,11,20-trione is obtained again.

Example 2.—4,17-dichloropregnane-3,11,20-trione

Following the procedure given in Example 1, but using hypochlorous acid, or a mineral acid with a hypochlorite such as sodium or calcium hypochlorite, or N-chlorosuccinimide or N-chloroacetamide with dilute sulfuric acid instead of the N-bromosuccinimide, to treat a solution of 3,11,20-triacetoxy-3,9,17(20)-pregnatriene in tertiary-butyl alcohol, 4,17-dichloropregnane-3,11,20-trione is obtained.

In the same manner, using other 3,11,20-tri-enol acylates of pregnane-3,11,20-trione and hypochlorous acid or an N-chloroacylamide, 4,17-dichloropregnane-3,11,20-trione is again obtained.

Example 3.—17-bromo-4-pregnene-3,11,20-trione

A solution of six grams of 4,17-dibromopregnane-3,11,20-trione in 150 milliliters of dioxane is admixed with a solution containing 2.74 grams of semicarbazide hydrochloride and 2.09 grams of sodium acetate in thirty millilters of water. The mixture is stirred for two hours at room temperature and thereafter a solution consisting of six milliliters of pyruvic acid in sixty milliliters of water is added. The reaction mixture is then heated to about seventy degrees centigrade for a period of three hours, and thereafter about one-half of the solvent is distilled and the residue then poured into 650 milliliters of water. The resulting mixture is extracted with three 150-milliliter portions of methylene dichloride and then 200 milliliters of ethyl acetate. The combined extracts are washed with sufficient one percent aqueous sodium hydroxide solution to remove pyruvic acid and its semicarbazone, and then twice with water. The solution is dried over anhydrous magnesium sulfate and concentrated under vacuum to yield five grams of an oil. This oil is triturated with ether to obtain crystals which on recrystallization from isopropyl alcohol and then ethyl acetate-hexane (Skellysolve B) yield 2.72 grams of 17-bromo-4-pregnene-3,11,20-trione; melting point 174 to 176 degrees centigrade;

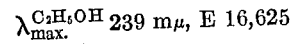
$\lambda_{max.}^{C_2H_5OH}$ 239 m$\mu$, E 16,625

Analysis.—Calculated for $C_{21}H_{27}BrO_3$: Br, 19.62. Found: Br, 19.64.

Example 4.—17-chloro-4-pregnene-3,11,20-trione

In the same manner as shown in Example 3, 4,17-dichloropregnane-3,11,20-trione is dehydrohalogenated with semicarbazide and pyruvic acid to yield 17-chloro-4-pregnene-3,11,20-trione.

Example 5.—4,16-pregnadiene-3,11,20-trione 17-bromo-4-pregnene-3,11,20-trione, 2.6 grams, is dissolved in 50 milliliters of dry pyridine and heated under reflux for a period of 24 hours. Thereafter the pyridine is removed by distillation under reduced pressure. The residue is then dissolved in methylene chloride and the resulting solution washed with aqueous two Normal hydrochloric acid and then with water. The washed solution is then dried over anhydrous magnesium sulfate and concentrated to dryness under reduced pressure. The thus-obtained crystals of 4,16-pregnadiene-3,11,20-trione are recrystallized from ethyl acetate hexane (Skellysolve B) to give 1.5 grams (76.5 percent yield) of 4,16-pregnadiene-3,11,20-trione; melting point 198 to 203 degrees centigrade.

Example 6.—4,16-pregnadiene-3,11,20-trione

In a manner as given in Example 5, 17-chloro-4-pregnene-3,11,20-trione is dehydrohalogenated with pyridine to yield 4,16-pregnadiene-3,11,20-trione.

In the same manner as in Examples 5 and 6, 17-halo-4-pregnene-3,11,20-triones are heated with collidine, lutidine, picoline, or other bases to produce 4,16-pregnadiene-3,11,20-trione.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. A process for the production of 4,16-pregnadiene-3,11,20-trione which comprises: forming a 3-hydrazone of 17-halo-4-pregnene-3,11,20-trione by reacting 4,17-dihalopregnane-3,11,20-trione with an organic hydrazine, hydrolyzing the thus-produced 3-hydrazone with a ketaldone to yield 17-halo-4-pregnene-3,11,20-trione, and dehydrohalogenating the thus-obtained 17-halo-4-pregnene-3,11,20-trione to obtain 4,16-pregnadiene-3,11,20-trione.

2. A process for the production of 4,16-pregnadiene-3,11,20-trione which comprises: forming a 3-hydrazone of 17-halo-4-pregnene-3,11,20-trione by reacting 4,17-dihalopregnane-3,11,20-trione with an organic hydrazine, hydrolyzing the thus-produced 3-hydrazone with a ketaldone selected from the group of pyruvic acid, pyruvic aldehyde, and benzaldehydes to yield 17-halo-4-pregnene-3,11,20-trione, and dehydrohalogenating the thus-obtained 17-halo-4-pregnene-3,11,20-trione to obtain 4,16-pregnadiene-3,11,20-trione.

3. A process for the production of 4,16-pregnadiene-3,11,20-trione which comprises: reacting 4,17-dichloropregnane-3,11,20-trione with semicarbazide, treating the thus-obtained 3-semicarbasone of 17-chloro-4-pregnene-3,11,20-trione with pyruvic acid to obtain 17-chloro-4-pregnene-3,11,20-trione, and heating the thus-obtained 17-chloro-4-pregnene-3,11,20-trione with pyridine to obtain 4,16-pregnadiene-3,11,20-trione.

4. A process for the production of 4,16-pregnadiene-3,11,20-trione which comprises: reacting a 4,17-dibromopregnane-3,11,20-trione with semicarbazide, treating the thus-obtained 3-semicarbasone of 17-bromo-4-pregnene-3,11,20-trione with pyruvic acid to obtain 17-bromo-4-pregnene-3,11,20-trione, and heating the thus-obtained 17-bromo-4-pregnene-3,11,20-trione with pyridine to obtain the 4,16-pregnadiene-3,11,20-trione.

5. 17-halo-4-pregnene-3,11,20-trione.

6. 17-bromo-4-pregnene-3,11,20-trione.

7. 17-chloro-4-pregnene-3,11,20-trione.

8. A process for the selective dehydrohalogenation of 4,17-dihalopregnane-3,11,20-trione to produce 17-halo-4-pregnene-3,11,20-trione which comprises: forming a 3-hydrazone of 17-halo-4-pregnene-3,11,20-trione by reacting 4,17-dihalopregnane-3,11,20-trione with an organic hydrazine and hydrolyzing the thus-produced 3-hydrazone with a ketaldone to obtain 17-halo-4-pregnene-3,11,20-trione.

9. A proces for the selective dehydrochlorination of 4,17-dichloropregnane-3,11,20-trione to produce 17-chloro-4-pregnene-3,11,20-trione which comprises: reacting 4,17-dichloropregnane-3,11,20-trione with semicarbazide and treating the thus-obtained 3-semicarbazone of 17-chloro-4-pregnene-3,11,20-trione with pyruvic acid to obtain 17-chloro-4-pregnene-3,11,20-trione.

10. A process for the selective dehydrobromination of 4,17-dibromopregnane-3,11,20-trione to produce 17-bromo-4-pregnene-3,11,20-trione which comprises: reacting a 4,17-dibromopregnane-3,11,20-trione with semicarbazide and treating the thus-obtained 3-semicarbazone of 17-bromo-4-pregnene-3,11,20-trione with pyruvic acid to obtain 17-bromo-4-pregnene-3,11,20-trione.

11. 4,17-dihalopregnane-3,11,20-trione.

12. 4,17-dibromopregnane-3,11,20-trione.

13. 4,17-dichloropregnane-3,11,20-trione.

14. A process for the production of 4,17-dihalopregnane-3,11,20-trione which includes mixing together 3,11,20-triacyloxy-3,9,17(20)-pregnatriene and a hypohalous acid to produce 4,17-dihalopregnane-3,11,20-trione.

15. A process for the production of 4,17-pregnadiene-3,11,20-trione which comprises: mixing together 3,11,20-triacyloxy-3,9,17(20)-pregnatriene and a hypohalous acid to obtain 4,17-dihalopregnane-3,11,20-trione, forming a 3-hydrazone of 17-halo-4-pregnene-3,11,20-trione by reacting 4,17-dihalopregnane-3,11,20-trione with an organic hydrazine, hydrolyzing the thus-produced 3-hydrazone with a ketaldone to yield 17-halo-4-pregnene-3,11,20-trione, and dehydrohalogenating the thus-obtained 17-halo-4-pregnene-3,11,20-trione to obtain 4,16-pregnadiene-3,11,20-trione.

References Cited in the file of this patent

UNITED STATES PATENTS

| Number | Name | Date |
|---|---|---|
| 2,563,247 | Kendall | Aug. 7, 1951 |
| 2,577,018 | Kendall | Dec. 4, 1951 |
| 2,590,978 | Kendall | Apr. 1, 1952 |
| 2,590,993 | McGuckin | Apr. 1, 1952 |